United States Patent [19]

Donovan et al.

[11] Patent Number: 4,766,483

[45] Date of Patent: Aug. 23, 1988

[54] AUTOMATIC COLOR TUNING SYSTEM WITH VARIABLE GAIN APC CIRCUIT

[75] Inventors: Timothy J. Donovan, Wheeling; Daniel L. Reneau, Elmhurst, both of Ill.

[73] Assignee: Zenith Electronics Corporation, Glenview, Ill.

[21] Appl. No.: 57,414

[22] Filed: Jun. 2, 1987

[51] Int. Cl.[4] .............................................. H04N 9/45
[52] U.S. Cl. .................................... 358/19; 358/25
[58] Field of Search .............................. 358/19, 25, 26

[56] References Cited

U.S. PATENT DOCUMENTS

| | | | |
|---|---|---|---|
| 4,015,287 | 3/1977 | Hovens | 358/19 |
| 4,255,759 | 3/1981 | Ohmori et al. | 358/23 |
| 4,443,769 | 4/1984 | Aschwanden et al. | 358/25 |
| 4,477,831 | 10/1984 | Hosoya | 358/26 |
| 4,544,943 | 10/1985 | Quan | 358/19 |
| 4,561,014 | 12/1985 | Douziech et al. | 358/25 |

Primary Examiner—John W. Shepperd

[57] ABSTRACT

An automatic color tuning system includes a counter controlled oscillator that is started in the middle of its controllable frequency range. If the counter counts around and no color burst signal is detected, the oscillator is stopped. Whenever the oscillator is sweeping, an automatic phase control circuit is operated at low gain for assuring that the oscillator will be close to the frequency of the color burst signal when lock-up occurs. Whenever the oscillator is stopped, the automatic phase control circuit gain is made high. Once the automatic phase control circuit locks up the oscillator to a color burst signal, a subsequent loss of the color signal does not re-initiate the counter.

12 Claims, 2 Drawing Sheets

AUTOMATIC COLOR TUNING SYSTEM WITH VARIABLE GAIN APC CIRCUIT

BACKGROUND OF THE INVENTION AND PRIOR ART

This invention relates generally to television receiver color tuning systems and in particular to a television receiver color tuning system.

There are many known varieties of automatic color tuning systems for television receivers. A conventional color tuning system includes a color oscillator that operates at a nominal frequency of 3.58 MHz, which is controlled or locked up with the color burst signal transmitted with the received color television signal. Generally a form of phase locked loop is used for this purpose with the loop gain being selected based upon a compromise between the divergent requirements of pull-in frequency range and speed of response. In automatic color tuning systems, the color oscillator is caused to sweep, that is, to change its frequency within a limited frequency range, for locking up the color burst.

Prior art automatic color tuning circuits that continuously sweep the oscillator frequency when color is undetected, produce interference patterns on the cathode ray tube. The interference pattern has a general "herringbone" configuration and is quite disconcerting to a viewer. With the circuit of the invention, sweeping of the color oscillator is minimized and therefore such distortion is minimized. Further, the color oscillator of the inventive circuit is always tuned closely to the color burst, when the color burst is present, and therefore requires a minimum offset voltage. This, as is well-known in the art, minimizes phase errors and broadens the "pleasing flesh tone" tuning range of the receiver.

OBJECTS OF THE INVENTION

A principal object of the invention is to provide a novel automatic color tuning circuit.

Another object of the invention is to provide an automatic color tuning circuit in which the color oscillator is always tuned close to the color burst.

A further object of the invention is to provide an automatic color tuning circuit with minimum visual disturbances.

BRIEF DESCRIPTION OF THE DRAWINGS

These and other objects and advantages of the invention will be apparent upon reading the following description in conjunction with the drawings in which.

DESCRIPTION OF THE PREFERRED EMBODIMENT

The system of the invention utilizes logic circuitry and a counter for incrementally controlling the frequency of the color oscillator in an automatic color tuning system. A five bit counter arrangement is used for this purpose. When the receiver is turned on, the counter, which counts from 0 to 31, is started at decimal count 12, which sets the oscillator to approximately the mid-range of its sweep frequency range. As the counter counts, the oscillator frequency is incrementally changed in a step-wise manner, with each count or increment representing about a 60 Hz change in frequency. If no color burst is detected during one complete sweep, that is, the counter counts through 31 and back to 13, the counter is disabled and the color oscillator frequency is maintained at the frequency corresponding to count 13. While the oscillator is being swept, the automatic phase control (APC) loop gain is kept low to restrict its pull-in range to within 60 Hz. When the counter stops, after the oscillator is swept through its restricted sweep frequency range once with no color burst being detected, the APC loop gain is increased. With the increased loop gain, the APC is capable of locking up the oscillator to a detected burst signal that falls within the oscillator restricted frequency range. Should a burst signal subsequently appear and be detected, the counter is reactivated and the APC loop gain is made low, while the oscillator frequency is swept again in search of the burst. If a color burst is found, the counter is deactivated and the APC loop gain is increased. Once color burst has been detected and lock up occurs, a loss of the burst signal will not result in resumption of sweeping of the oscillator frequency. Rather, the oscillator remains tuned to the frequency at which the burst was captured. With the inventive arrangement, the oscillator is precluded from being continually swept when no usable burst is detected. Further, when the oscillator is locked up to the burst signal, it will be tuned to within 60 Hz of the burst frequency and therefore have a minimum offset voltage requirement. Also, should the burst drop out or disappear for any reason, the oscillator frequency will not change; it remains tuned to the frequency where the burst was. Thus, the circuit provides for a minimum amount of tuning and retuning of the oscillator and also assures that when the oscillator is tuned, it will be very close to the burst frequency, thus minimizing the required offset voltage.

Figure 1:
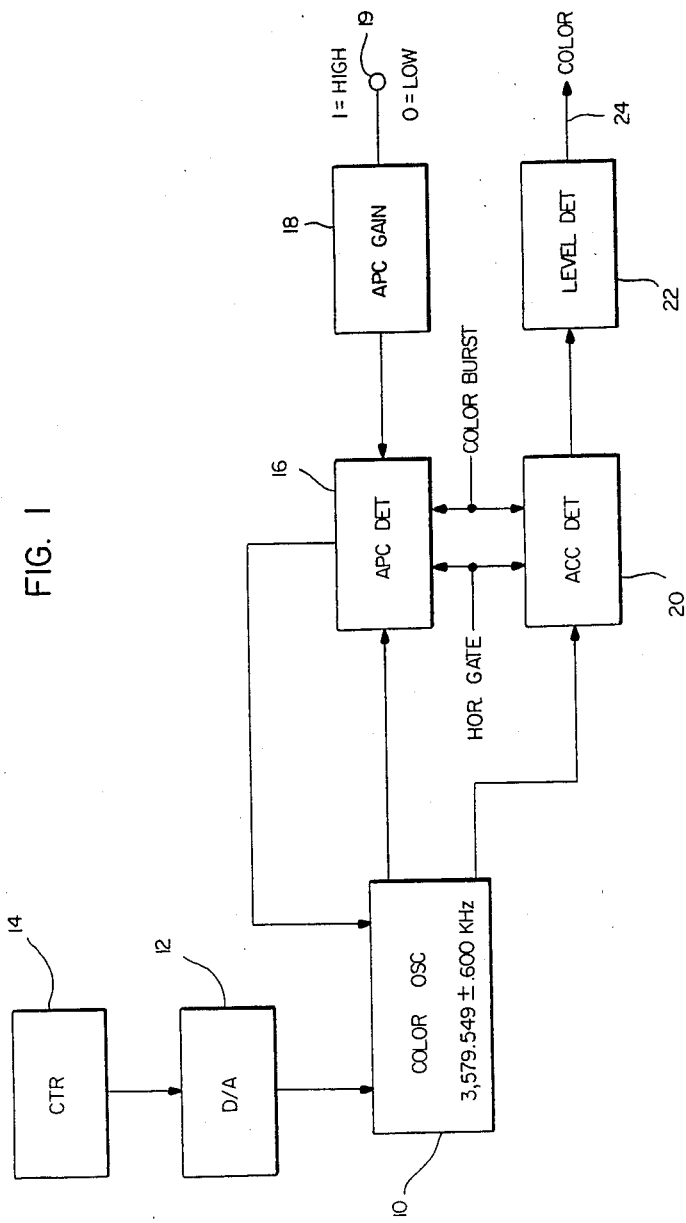
FIG. 1 is a partial, simplified block diagram of the automatic color tuning circuit of the invention.

Referring to FIG. 1, a color oscillator 10, that is free-running at a frequency of 3.579 MHz, supplies an APC detector circuit 16 and an automatic color control (ACC) detector circuit 20. Both circuits 16 and 20 are supplied with a color burst signal from a color burst detector circuit (not shown) and with a horizontal gating pulse from a horizontal deflection circuit (not shown). The output of ACC circuit 20 is supplied to a level detector 22 which in turn places a signal on a lead 24 to indicate that a color signal has been detected. For convenience, this signal is referred to as color. A separate block 18, labelled APC gain, is coupled to APC circuit 16 and includes an input terminal 19. When the voltage on input terminal 19 is at a logic 1 level, the APC gain circuit 18 imparts a high gain characteristic to APC circuit 16 and when the voltage at terminal 19 is at a logic 0 level, APC gain circuit 18 imparts a low gain characteristic to APC circuit 16. The depiction of the APC gain circuit as separate from APC circuit 16 will be understood to be for convenience only. The APC circuit and gain circuit are both well-known in the art. Color oscillator 10 is supplied from a counter circuit 14 through a digital-to-analog (D/A) converter 12. As will be seen, the various inputs to the elements of FIG. 1 and the outputs therefrom are included in FIG. 2.

Figure 2:
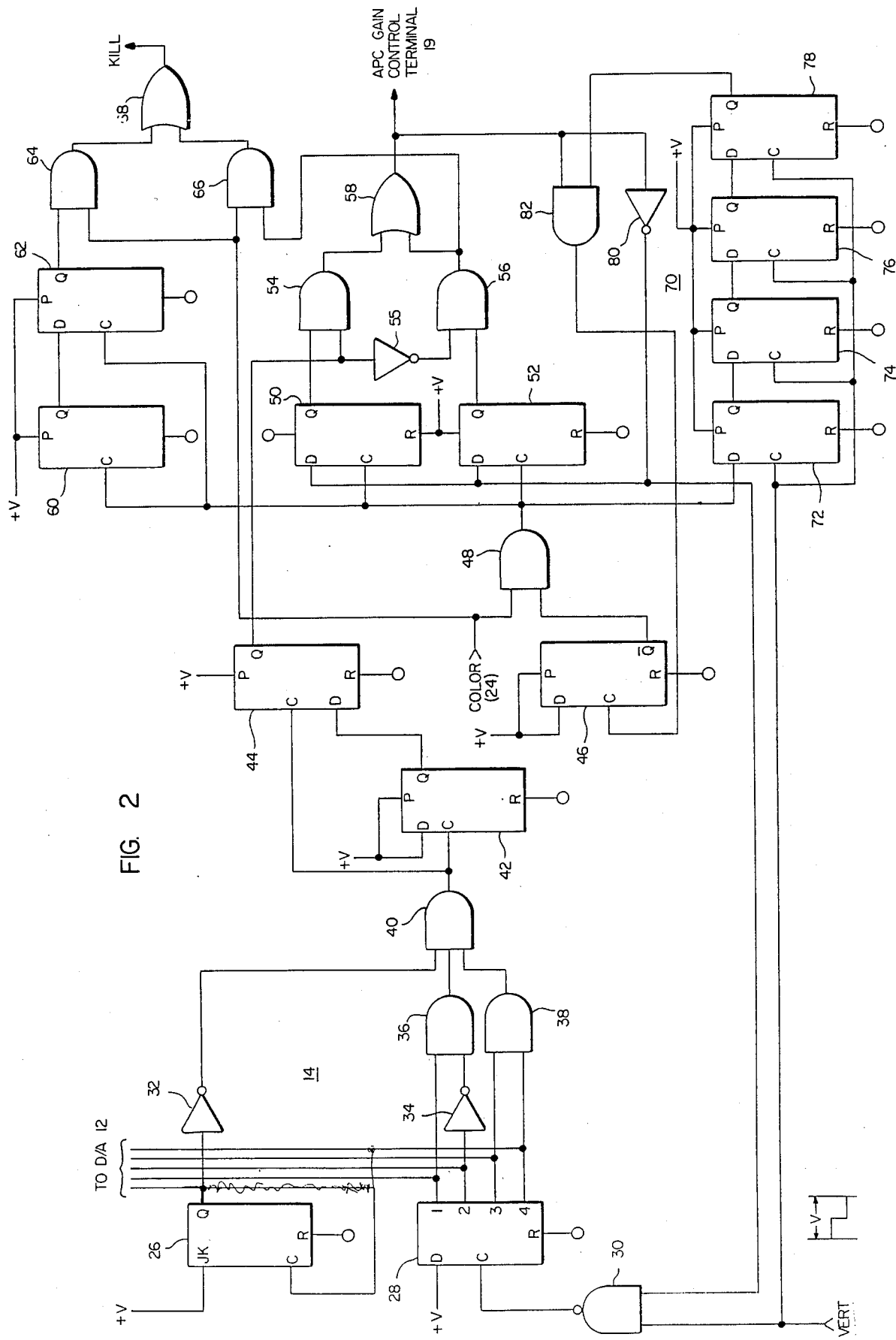
FIG. 2 is a partial schematic diagram of the control logic for the circuit of the invention.

In FIG. 2, counter 14 is a 5 bit counter consisting of a 1 bit JK flip-flop 26 and a four bit counter 28. It will be appreciated that the circuit implementation is for explanatory purposes and would, for obvious reasons, differ in a production embodiment. These logic devices include a reset terminal which, it will be understood unless otherwise mentioned or illustrated, is connected to a source of power reset signal (not shown) that comprises a pulse source of sufficient duration for resetting all of the logic devices. The Q output of flip-flop 26 is supplied through an inverter 32 to one input of a three input AND gate 40. A first output of counter 28 is connected to one input of a two input AND gate 36, the output of which is connected to another input of AND gate 40. A second output of counter 28 is supplied through an inverter 34 to the second input of AND 36. Two more outputs of counter 28 are supplied to an AND gate 38, the output of which is supplied to AND 40. Further, the various outputs of the counter 14 are indicated as being supplied to D/A converter 12. The 5-bit counter is a ripple-type counter with the LSB clock supplied through a NAND gate 30. NAND gate 30 has two inputs, one of which consists of a 50% duty cyle half vertical rate pulse and the other of which is an inverted APC gain control signal which is used for controlling the gain of APC circuit 16 (FIG. 1) and is inverted by an inverter 80 prior to being supplied to NAND 30.

The output of AND gate 40 is connected to the clock inputs of D type flip-flops 42 and 44. Another D type flip-flop 46 has its clock input supplied from an AND gate 82 that has one input supplied with the APC gain control signal and another input that is coupled to a four count counter 70. The vertical pulse is supplied to counter 70, which consists of D flip-flops 72, 74, 76 and 78, arranged to generate an output pulse at the Q terminal of flip-flop 78 on the fourth vertical pulse after color is detected. The $\bar{Q}$ output of flip-flop 46 is coupled to one input of a two input AND gate 48, the other input of which is supplied with the color signal on lead 24 (from FIG. 1). The output of AND 48 is coupled to the clock inputs of D type flip-flops 50, 52, 60 and 62 and to the D input of flip-flop 72. The Q output of flip-flop 50 is connected to one input of a two input AND gate 54 and the Q output of flip-flop 52 is supplied to one input of a two input AND gate 56. The Q output of flip-flop 44 supplies the second input of AND gate 54 and, through an inverter 55, supplies a second input of AND gate 56. The outputs of ANDs 54 and 56 are coupled to an OR gate 58, the output of which developes the APC gain control signal. The output of AND 56 is also supplied to one input of a two input AND gate 66.

The output of flip-flop 60 is connected to the D input of flip-flop 62, the Q output of which is connected to one input of a two input AND gate 64. The second inputs of ANDs 64 and 66 are supplied with the color signal from lead 24. The outputs of ANDs 64 and 66 are supplied to an OR gate 68, the output of which is labelled "KILL." The kill signal is used to disable the chroma amplifier (not shown) in the absence of detected color burst signal.

In operation, assume that the color burst signal is detected before counter 14 reaches count 13 for the second time (it is initially started at count 12). When a color burst is detected, the output of AND 48 goes high which clocks the output of flip-flop 52 high, sending the output of AND 56 and OR 58 high. Since the output of OR 58 is high, APC gain control 18 (FIG. 1) sets the APC to a high gain. Simultaneously, counter 14 is disabled through inverter 80 and AND 30. The high logic level at the output of AND 48 is clocked through flip-flops 72, 74, 76 and 78, causing the output of AND 82 to go high after four counts of vertical pulses. When this occurs, the $\bar{Q}$ output of flip-flop 46 goes low and disables AND 48. Thus, no further information concerning the presence of color is permitted to affect APC gain control 18. This assures that the APC gain does not change and that counter 14 is not reinitiated if color is lost, for example, due to a channel change or to a black and white signal being received. If color is lost for some reason, the kill signal output goes low to disable the chroma amplifier until color is again detected, at which point the kill output signal goes high. This is by virtue of the connection of the color signal through AND 66 and OR 68.

If color is not detected when counter 14 reaches a count of 13 (for the second time), the output of AND 40 goes high and flip-flop 44 develops a high logic level at its Q output. This causes the output of AND 54 to go high and, through OR 58, the APC gain control signal to go high, which again disables counter 14 through inverter 80 and NAND 30. As mentioned, with the APC gain high, color can be detected within the selected frequency range of the color oscillator. When color is detected, flip-flop 50 has its Q output go to a low logic level which, via AND 54 and OR 58, drives the gain control voltage low and enables counter 14, via inverter 80 and NAND 30. At this point, the output of flip-flop 60 is high and the output of flip-flop 6 is low and the kill signal is low by virtue of OR 68. Counter 14 counts and changes the frequency of the oscillator in a step-wise manner, with each step corresponding to a count of the counter, until the oscillator frequency is such that color is detected. Upon detection of color, the outputs of flip-flops 50 and 62 are both clocked high and flip-flop 50, through AND 54 and OR 58, causes the APC gain control signal to go high, again disabling counter 14. Flip-flop 62, in conjunction with the color signal, causes the color kill signal to go high whenever color is present and low when color is not present. Again, the high at the output of AND 48 is clocked through flip-flops 72, 74, 76 and 78 resulting in the output of AND 82 going high after four vertical pulses, and clocks a low into the $\bar{Q}$ output of flip-flop 46 to disable AND 48. Thus no further information concerning the presence of color is permitted to affect the APC gain level and counter 14 will not be re-enabled even though color is subsequently lost.

It is recognized that numerous changes and modifications in the described embodiment of the invention will be apparent to those skilled in the art without departing from its true spirit and scope. The invention is to be limited only as defined in the claims.

What is claimed is:

1. An automatic tuning circuit for a color television including a color burst signal comprising:
   automatic phase control means including a tunable oscillator for locking up to said color burst signal;
   means for adjusting the tuning of said tunable oscillator to search for said color burst signal within a limited frequency range; and
   means for rendering the gain of said automatic phase control means low while said tunable oscillator is searching and high when said tunable oscillator is not searching, thereby assuring that said tunable oscillator is within a predetermined frequency of said color burst signal when said automatic phase control locks up.

2. The circuit of claim 1, further including a counter and a D/A converter for supplying incremental voltages to said tunable oscillator whereby the oscillator frequency is changed in increments.

3. The circuit of claim 2, futher including means for controlling operation of said counter to stop said counter near the midpoint of its counting range if said burst signal is not found and increase the gain of said automatic phase control means from said low gain to said high gain.

4. The circuit of claim 3 wherein said counter is enabled to commence counting again when a color burst signal is found.

5. The circuit of claim 4 wherein said tunable oscillator has a free-running frequency range and wherein said automatic phase control means is capable of locking up with said color burst, when operating at said high gain, anywhere within said free-running frequency range of said oscillator.

6. An automatic tuning circuit including automatic phase control means for locking up a tunable oscillator to a color burst signal comprising:

counter means for incrementally adjusting the frequency of said tunable oscillator within a selected frequency range;

means for changing the gain of said automatic phase control means from a high gain to a low gain, said automatic phase control means being capable of locking up said tunable oscillator to a detected color burst signal within said selected frequency range when at said high gain and being capable of locking up said tunable oscillator to a detected color burst signal only when within a frequency difference determined by one count of said counter means when in said low gain;

control means for stopping said counter means to maintain said tunable oscillator near the middle of said selected frequency range when a color burst signal is not detected;

means for operating said automatic phase control means at said high gain when said counter means is stopped; and means for operating said automatic phase control means at said low gain when said counter means is incrementally adjusting the frequency of said tunable oscillator.

7. The circuit of claim 6 wherein said control means stops said counter means when said counter means adjusts said tunable oscillator through said selected frequency range one time.

8. The circuit of claim 7 wherein said control means restarts said counter means in the presence of a detected color burst signal for locking up said tunable oscillator to said color burst signal within a frequency difference determined by one count of said counter means.

9. The method of automatically tuning to a color signal with an oscillator and automatic phase control means comprising the steps of:

sweeping the frequency of said oscillator through a limited frequency range with the gain of the automatic phase control means at a low value; and switching to a high value of gain for the automatic phase control means when a color signal is found.

10. The method of claim 9, further comprising the step of:

stopping said oscillator near the middle of said limited frequency range if a color signal is not found; and switching to a high value of gain for said automatic phase control means.

11. The method of claim 10, further including the step of:

sweeping the frequency of said oscillator again with the gain of said automatic phase control means at said low value if a color signal is subsequently received.

12. The method of claim 11, further including counting means for operating said oscillator in a stepped manner.

* * * * *